United States Patent [19]

Nonaka

[11] Patent Number: 5,424,884
[45] Date of Patent: Jun. 13, 1995

[54] DISK DRIVE WITH CLEANING DEVICE, AND CLEANING METHOD

[75] Inventor: Takashi Nonaka, Kanagawa, Japan

[73] Assignee: Mitsubishi Denki Kabushiki Kaisha, Tokyo, Japan

[21] Appl. No.: 129,801

[22] Filed: Sep. 30, 1993

Related U.S. Application Data

[63] Continuation of Ser. No. 616,052, Nov. 20, 1990, abandoned.

[30] Foreign Application Priority Data

Nov. 22, 1989 [JP] Japan ............................... 1-304321

[51] Int. Cl.⁶ ............................................. G11B 15/48
[52] U.S. Cl. .............................. 360/74.1; 360/73.03; 360/128; 360/137
[58] Field of Search ................. 360/69, 71, 75, 128, 360/70.08, 74.1, 73.03, 137

[56] References Cited

U.S. PATENT DOCUMENTS

| | | | |
|---|---|---|---|
| 3,609,721 | 9/1971 | Meneley | 340/174 |
| 4,510,541 | 4/1985 | Sasamoto | 360/97 |
| 4,594,617 | 6/1986 | Tezuka | 360/128 X |

FOREIGN PATENT DOCUMENTS

| | | |
|---|---|---|
| 0089451 | 9/1983 | European Pat. Off. . |
| 56-169226 | 12/1981 | Japan . |
| 60-50614 | 7/1985 | Japan . |
| 63-136950 | 7/1985 | Japan . |
| 61-182685 | 8/1986 | Japan .................. 360/128 |
| 61-315524 | 12/1986 | Japan . |
| 62-57999 | 4/1987 | Japan . |
| 1-189017 | 7/1989 | Japan .................. 360/128 |
| PCT/US82/-00378 | 4/1983 | WIPO . |

OTHER PUBLICATIONS

"Engineering Design of a Disk Storage Facility with Data Modules" R. B. Mulvany, Nov., 1974, Design of IBM 3340 and 3348, pp. 489–505.

Primary Examiner—Aristotelis Psitos
Assistant Examiner—James T. Wilson
Attorney, Agent, or Firm—Wolf, Greenfield & Sacks

[57] ABSTRACT

A disk device with a cleaning device and a cleaning method according to the present invention include cleaning motor control means for rotating a disk oppositely to a direction of rotation of the disk in recording and regeneration, and seeking means for forcing a slider to seek the disk over a whole recording region during the opposite rotation of the disk to permit any dust to adhere to the slider, whereby a motor is started and stopped (contract-start-stop) after cleaning the recording region, so as to force the dust adhering to the slider to fall on a disk surface for cleaning the slider.

31 Claims, 7 Drawing Sheets

DISK DRIVE WITH CLEANING DEVICE, AND CLEANING METHOD

This application is a continuation of application Ser. No. 07/616,052, filed Nov. 20, 1990, now abandoned.

BACKGROUND OF THE INVENTION

1. Field of the Invention

The present invention relates to a disk device an external memory device of a computer, and more specifically to disk cleaning.

2. Description of the Prior Art

Referring to FIGS. 8 through 11, there are illustrated operations of a magnetic disk and a magnetic head in a magnetic disk device, respectively. In each figure, designated at 1 is a magnetic disk, 2 is a slider for holding a transducer that is to record/regenerate information on/from the disk 1, 3 is a support spring for forcing the slider 2 to follow the disk 1, 4 is a tapered portion provided on the slider 2, 5 is an arrow indicating the direction of rotation of the disk 1 at recording and regeneration on the disk, 6 is an arrow indicating the direction of seeking by the slider 2, 7 is dust, and 8 is a non-recording region on the disk 1.

Figure 8:
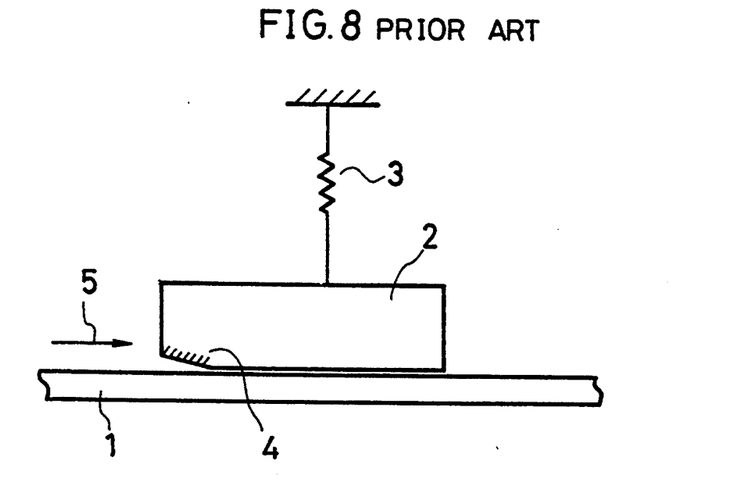
FIGS. 8 through 11 are views each illustrating problems in a prior disk device.

Operation of the above arrangement is as follows:

as illustrated in FIG. 8, the slider 2 is pushed against the disk 1 by the support spring 3 at a static state, and is allowed to make static contact with the disk 1.

Once the disk 1 starts to rotate in a direction indicated by the arrow 5, an air stream is produced on the surface of the disk 1 and is allowed to strike the tapered portion 4 as a wind pressure, which portion is thereby pushed up to float the slider 2.

Figure 9:
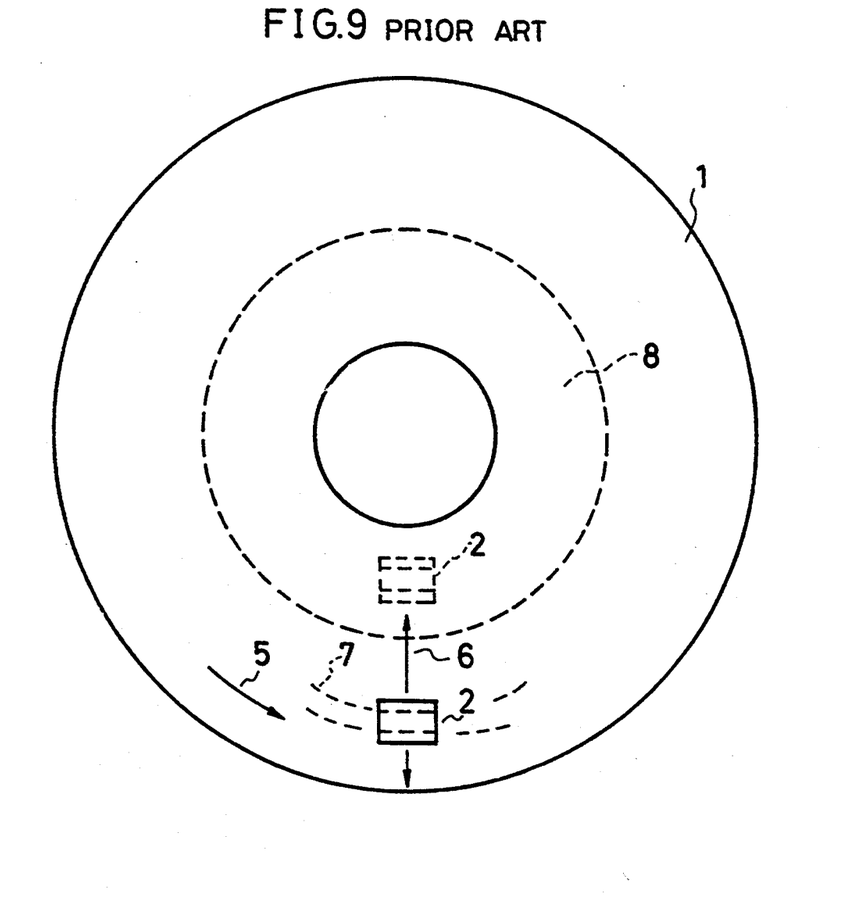

The slider 2 is allowed to float and stop generally in a non-recorded region 8 of the disk 1 as indicated by a dotted line in FIG. 9. As the disk 1 goes into steady rotation, the slider 2 moves to a position indicated by a solid line 2 in the figure, and selects a track arranged coaxially on the disk 1 while seeking those tracks in the direction indicated by the arrow 6, to record/regenerate information on/from the track.

Figure 10:
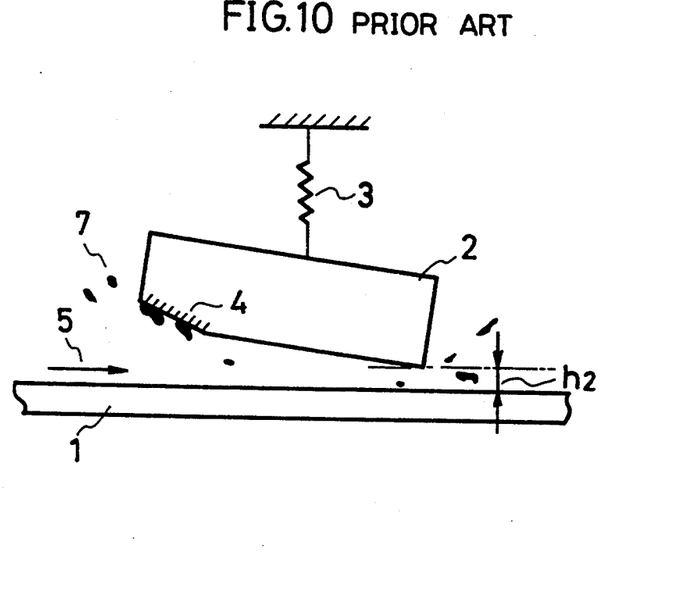

For the lifted attitude of the slider 2, the slider 2, which is pushed up and lifted by wind pressure exerted on the tapered portion 4 as shown in FIG. 10, is lifted to a higher position on the leading edge side where the tapered portion 4 has been provided, while being lifted to a lowest position, a height $h_2$, on the trailing edge side.

Figure 11:
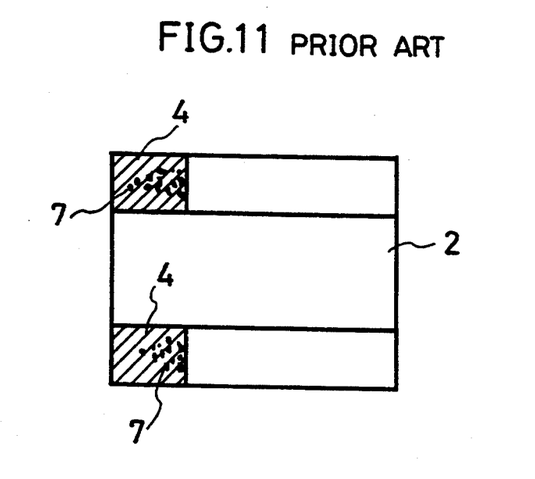

Additionally, as illustrated in FIG. 10, any dust such as dirt (hereinafter referred to dust) existent around the disk 1 is entrained by the air flow with the rotation of the disk 1 to strike the tapered portion 4 of the slider 2 together with the air flow, and allowed to adhere partly to the tapered portion 4. This causes such dust to be accumulated on the tapered portion 4 located on the back side of the slider 2 for a long period of time, as illustrated in FIG. 11.

In the prior magnetic disk device, any dust is accumulated on the tapered portion with the elapse of time as described above. The slider is however difficult to be cleaned. Particularly, in a closed magnetic device capable of dealing with a recent trend of making the device high density, it is impossible to clean the interior of the device without disassembly the device, and accumulated dust interrupts the operation of the tapered portion to cause the unstable lifted attitude of the slider and hence head crashing.

To solve such a difficulty, there is known as a prior art "a magnetic disk device" disclosed in the device of Japanese Utility Hodel Laid-Open No. 62-57999. In this prior art, any dust adhering to a disk surface is scattered by a slider by rotating the disk at a low rotational speed in the same direction as the direction of rotation of the disk during recording and regeneration, and bringing the slider near to the disk surface to repeatedly seek the disk several times.

Accordingly, also in the prior device, although cleaning of the disk surface is likely to some extent, the dust will be still accumulated on the tapered portion, so that removal of any dust accumulated on the tapered portion is difficult, causing a malfunction of the tapered portion. Thus, there is still a problem that head crashings may occur.

SUMMARY OF THE INVENTION

In view of the drawbacks with the prior art, it is an object of the present invention to provide a disk device with a cleaning device and a cleaning method capable of self-cleaning a disk with simplified construction and of preventing any dust from being deposited on a tapered portion.

A disk device with a cleaning drive and a cleaning method according to the present invention comprises cleaning motor control means for rotating the disk oppositely to a direction of rotation for recording and regeneration and seeking means for forcing said slider to seek the disk over a whole recording area on the same when said disk is being rotated oppositely for allowing any dust to be deposited on the slider, said cleaning motor control means stops (CSS. Contact-Start-Stop) the driving of a motor, after the slider is sought, to force the dust deposited on said slider to fall on a disk surface.

The above and other objects, features, and advantages of the invention will become more apparent from the following description when taken in conjunction with the accompanying drawings.

DESCRIPTION OF THE PREFERRED EMBODIMENT

In what follows, an embodiment of the present invention will be described with reference to the accompanying drawings. Referring to FIGS. 1 through 5, there are illustrated an embodiment of a disk device including a cleaning device, and a cleaning method, respectively. The same symbols as those illustrated in FIGS. 8 through 11 indicate the same or corresponding portions.

Figure 1:
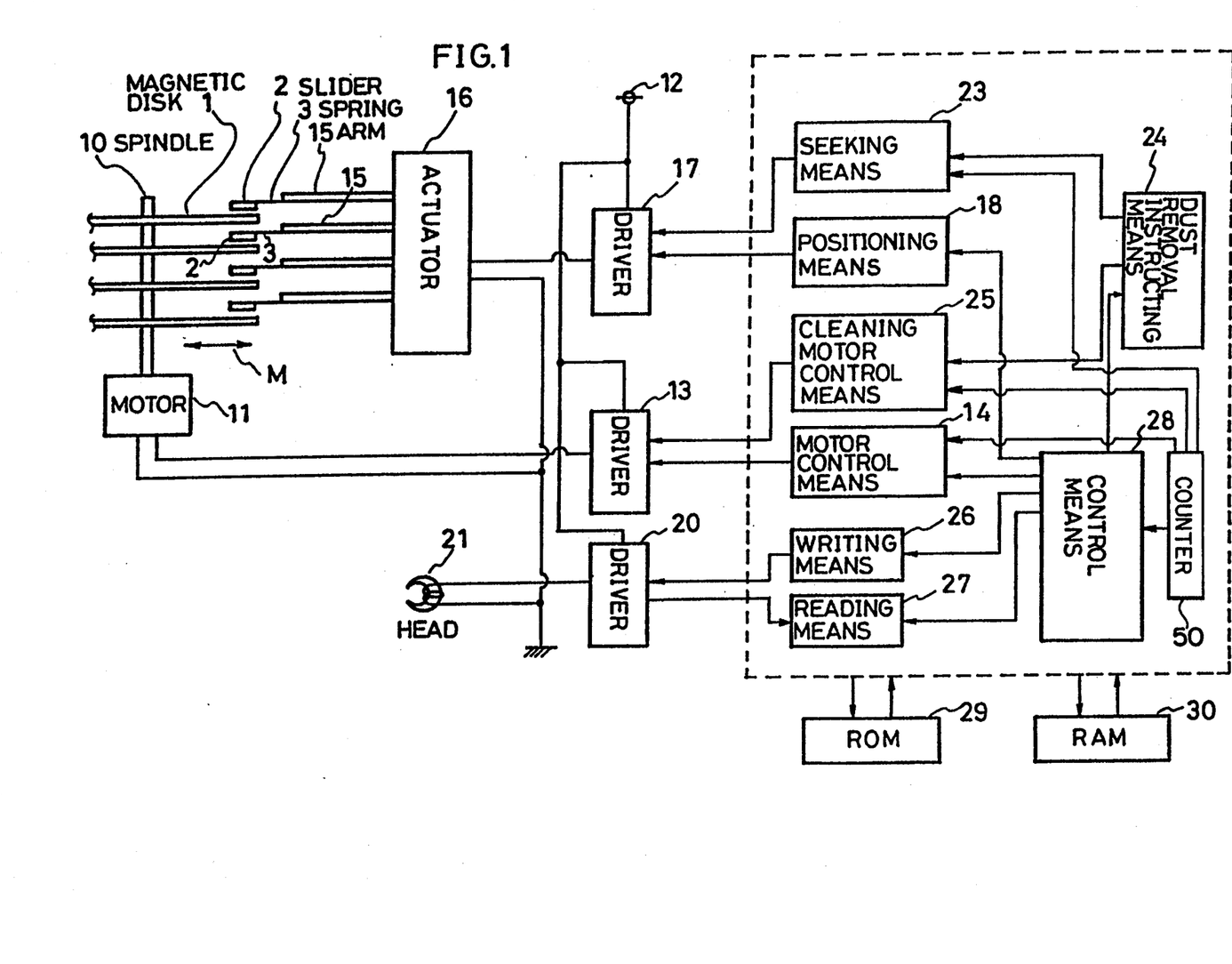
FIG. 1 is a block diagram illustrating an embodiment of a disk device including a cleaning device according to the present invention.

Referring to FIG. 1, which is the block diagram of the embodiment of the disk device having the cleaning device according to the present invention, a plurality of magnetic disks 1 are attached to a spindle 10 which is forwardly or backwardly rotated or stopped by a motor 11. The motor 11 is driven and stopped by a driver 13 connected to a power supply, and the driver 13 is controlled by motor control means 14. An arm 15, which supports a spring 3, is driven by an actuator 16. On the basis of operation of the actuator 16, a slider 2 is shifted radially (in the direction of an arrow M) of the magnetic disk, and sought. The actuator 16 is controlled by positioning means 18 through a driver 17 connected to the power supply. Designated at 26 is writing means for writing any information on a magnetic head 21 by supplying power to a magnetic head 21 through a driver 20, and 27 is reading means for reading through the driver 20 any information read by the magnetic head 21. Additionally, designated at 23 is seeking means for seeking the slider 2 by driving the same according to an instruction from dust removal instructing means 24, 25 is cleaning motor control means for reversely rotating the motor 11 and repeatedly driving and stopping the same by driving the same according to an instruction from the dust removal instructing means 24, 28 is control means, 29 is a ROM, and 30 is a RAM.

Figure 2:
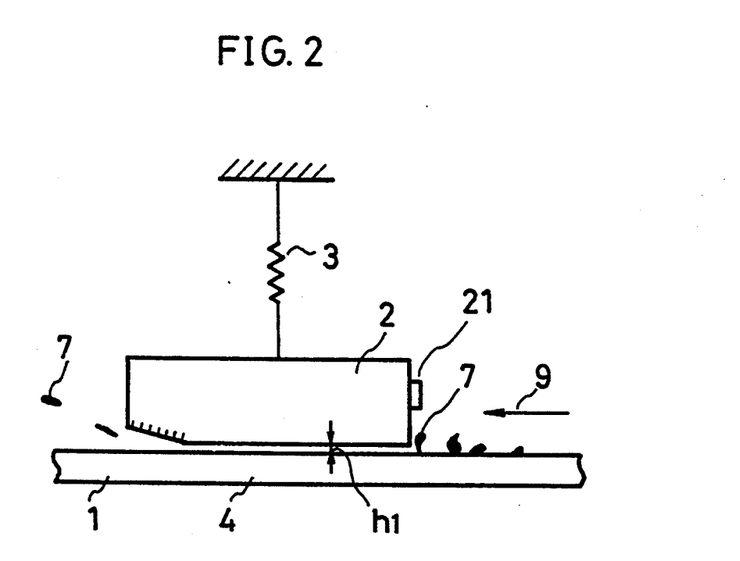
FIGS. 2 and 3 are views each illustrating conditions under which dust adheres to the rear end of a slider.
Figure 4:
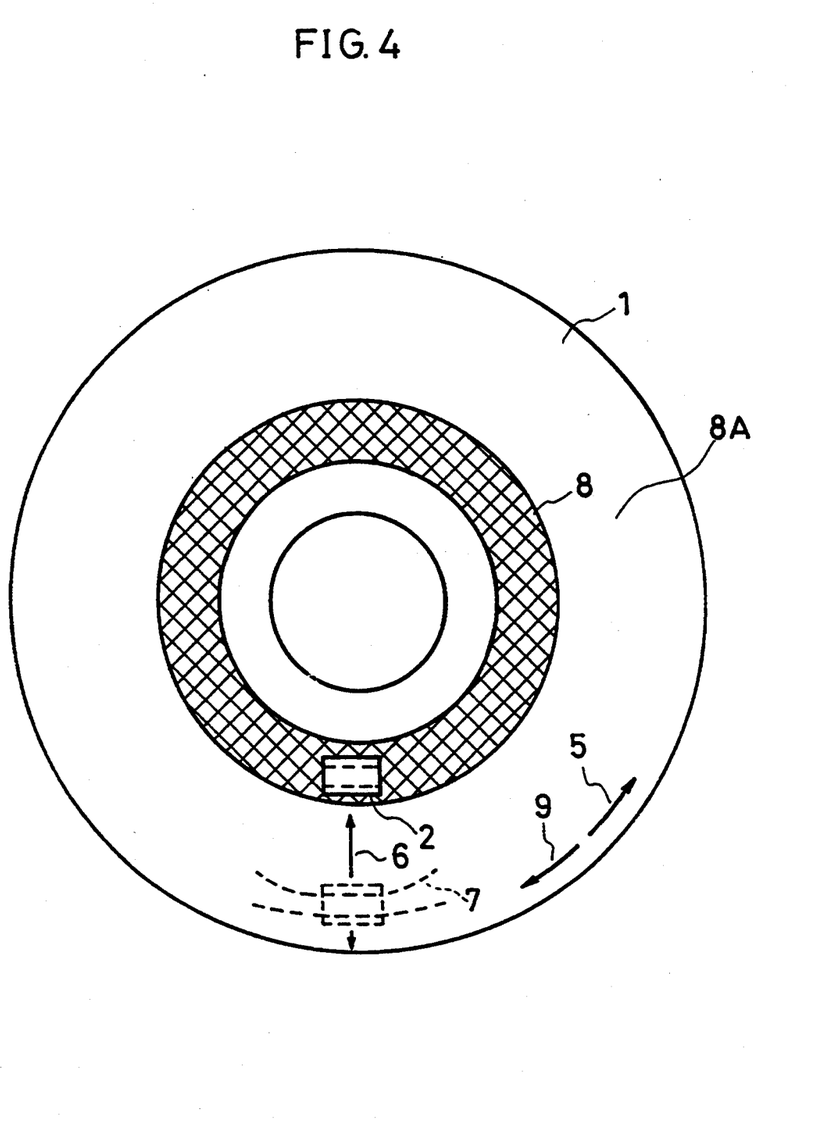
FIG. 4 is a view illustrating conditions under which the slider is sought.

In FIGS. 2 and 4, an arrow designated at 9 indicates the direction of rotation of the disk 1 at self-cleaning, that is an opposite direction to the direction of rotation 5 of the same at recording and regeneration. Further, a symbol $h_1$ designates a floating height of the slider 2 when the disk 1 is rotated at a low rotational speed in the direction of the arrow 9. The height $h_1$ is sufficiently smaller than a height $h_2$ shown in FIG. 10.

In succession, the operation of the embodiment will be described.

For write/read operation of information, the motor control means 14 is driven by the control means 28 to drive the motor 11 forwardly and hence rotate the disk 11 forwardly, say in the direction of the arrow 5. Hereby, the slider 2 is driven to float by $h_2$. Successively, the positioning means 18 is driven to position the slider 2 from the non-recording region 8 to a predetermined track in a recording region 8A for write/read operation of information by the writing means 26 or the reading means 27.

Figure 5:
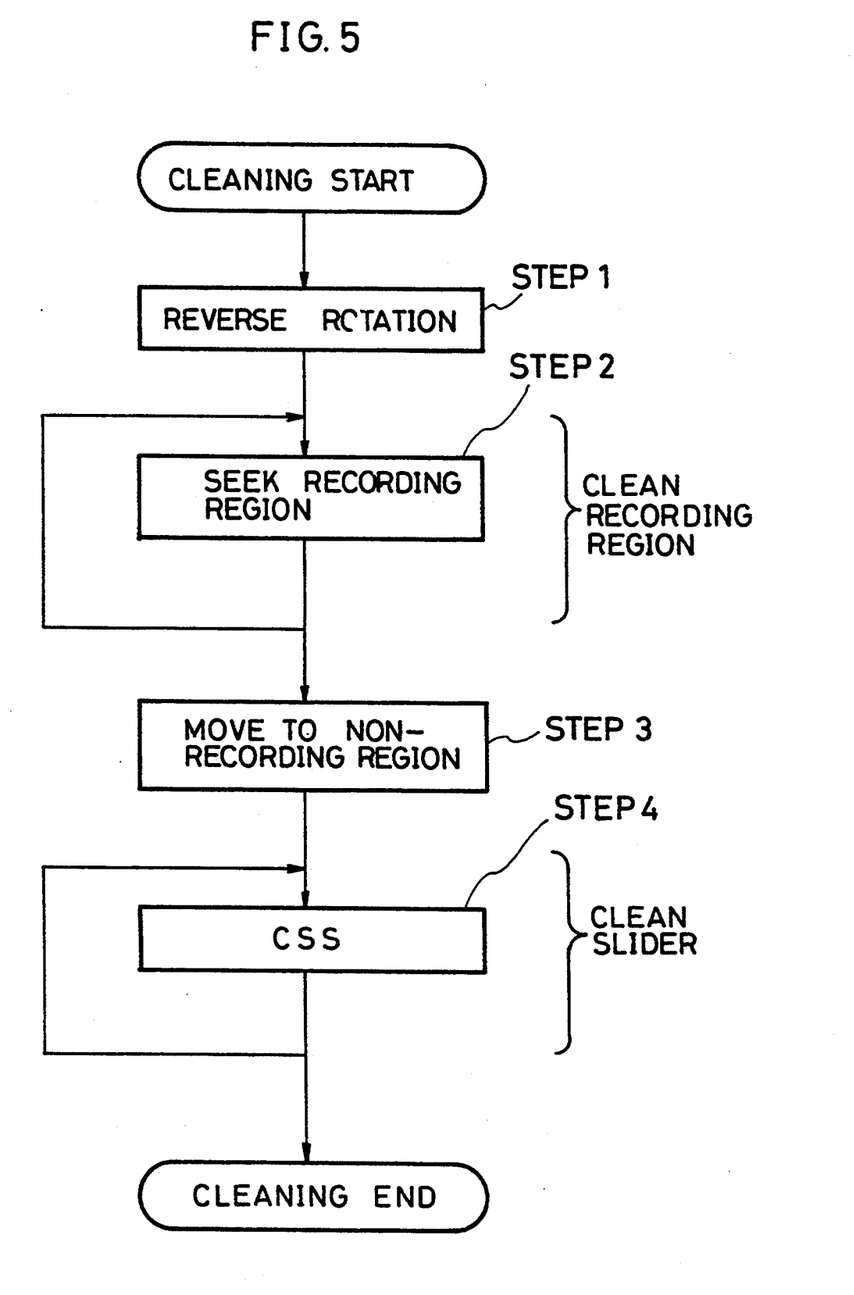
FIG. 5 is a flowchart illustrating the operation of the present invention.

Now, the operation will be further described with reference to the flowchart of FIG. 5.

In the present invention, a self-cleaning of the magnetic disk is performed prior to the start of the aforementioned write/read operation. For the self-cleaning, the cleaning motor control means 25 is actuated by the dust removal instructing means 24 to rotate the disk 1 at a low rotational speed in the opposite direction to that indicated by the arrow 5, i.e., in the opposite direction to the ordinary read/write direction (Step 1).

With such rotation of the disk 1, an air flow produced on the surface of the disk 1 as illustrated in FIG. 2 hits the slider 2 as a wind pressure to float the same. However, the tapered portion 4 is not located on the side of the trailing edge, so that the floating height $h_1$ of the slider 2 is considerably smaller than the floating height $h_2$ and hence the slider 2 floats on the surface of the disk 1, separated away only a fine distance from the same.

Herein, such a rotational speed of the disk 1 in the reverse direction indicated by the arrow 9 may be about 500–1,000 rpm although an ordinary one is 3,600 rpm.

Further, the reason to rotate the disk 1 at the low rotational speed is as follows: the floating height of the slider 2 is substantially determined by a relative speed between the disk 1 and the slider 2 if the shape of the slider remains unchanged, and the floating height of the slider 2 is higher as the relative speed is higher. However, any floating dust, which is very small in size, simply passes through between the disk 1 and the slider 2 when the floating height is greater, and hence does not adhere to the slider 2 so much. Accordingly, the disk 1 is rotated at the low rotational speed to permit the slider 2 to float at a low height for allowing any dust to be liable to adhere to the slider 2.

In succession, the disk 1 is rotated in the recording region 8A to permit any coming dust to positively adhere to the trailing edge side of the slider 2. Herein, the seeking means 23 is actuated to repeatedly seek the track surface of the disk 1 in the recording region 8A in the direction of the arrow 6 for cleaning of the recording region 8A on the disk 1 (Step 2).

Figure 3:
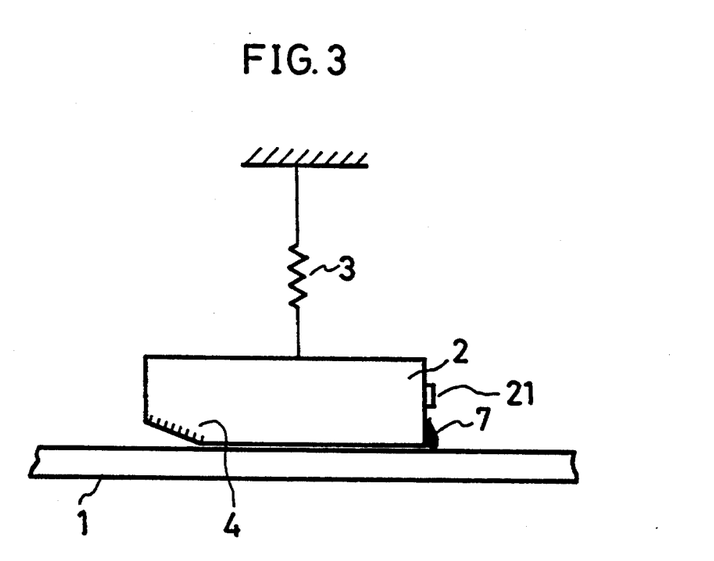
Figure 6:
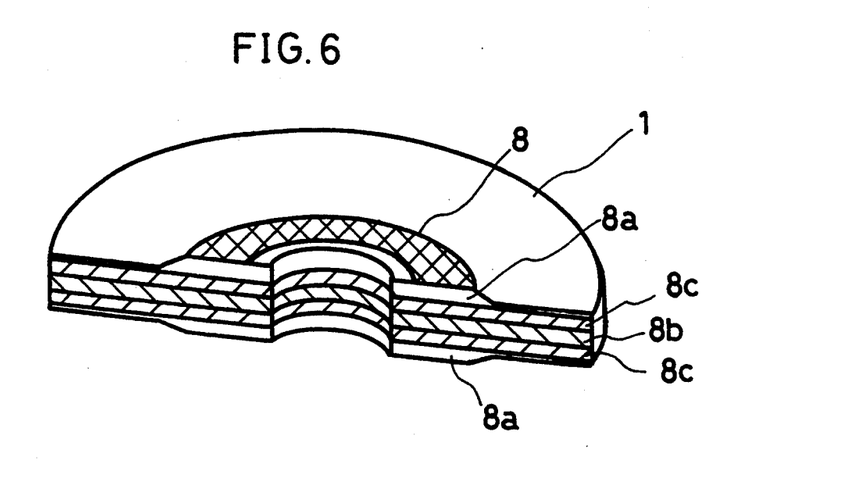
FIGS. 6 and 7 are views each illustrating a disk which is preferable for application of the present invention.

With the completion of the cleaning, the seeking means 23 moves the slider 2 to the non-recording region 8 which is not used during the recording and regeneration (Step 3). The cleaning motor control means 25 repeatedly drives and stops the motor in the non-recording region 8 to repeatedly perform the CSS (Contact-Start-Stop) of the slider 2 to the magnetic disk 1. Herein, the disk 1 is rotated in the ordinary direction of rotation. Hereby (Step 4), any dust adhering to the trailing edge is forced to positively fall on the disk surface for cleaning the slider 2, as illustrated in FIG. 3. Herein, the write/read operation of the information is interrupted during the actuation of the dust removal instructing means 24. Additionally, the foregoing CSS means that the slider 2 makes contact with the disk surface during the stop of the disk and it floats as the speed of rotation of the disk increases. Further, although the cleaning of the slider 2 has been described as being done in the same direction as the ordinary direction of the rotation of the disk 1, this originates from a fact that exfoliating force to any dust is produced in the opposite direction to the adherence of the dust to ease the falling of the dust. Additionally, for the cleaning of the slider 2, the disk 1 may be reversed in its rotation at each CSS. Furthermore, the falling of any dust may be secured by making thick a lubricating layer in the non-recording region 8 or by properly varying the surface roughness of that region. More specifically, there is a property that the slider 2 is liable to attract any dust as the lubricating layer 8a is made thicker. Accordingly, the slider 2 can easily attract any dust in the non-recording region 8 with such construction as illustrated in FIG. 6. Hereby, any dust on the slider 2 is liable to fall with the repeated CSS. Herein, numeral 8b is a substrate and 8c is a magnetic layer, in FIG. 6.

Figure 7:
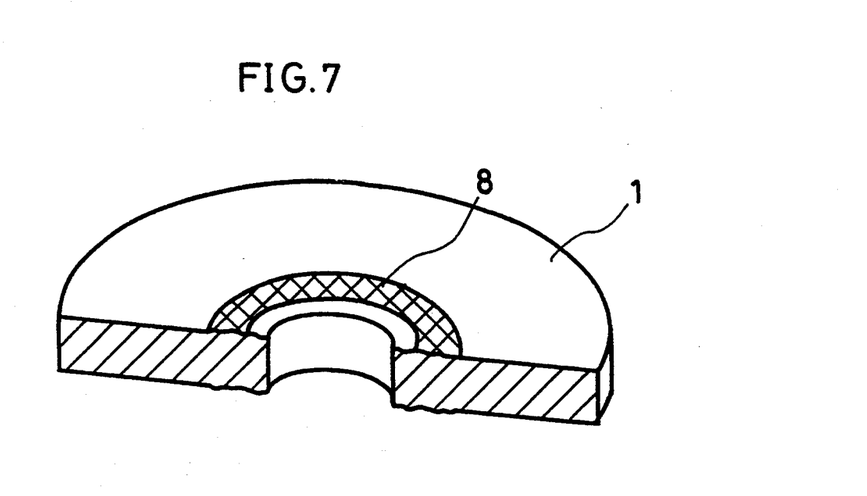

Additionally, as illustrated in FIG. 7, frictional force is made greater to ease the falling of the dust on the slider 2 provided that the surface of the non-recording region 8 is roughened. Although, in FIG. 7, the roughened surface was illustrated as extending over the whole non-recording region 8, the surface may be existent on a track partially in the non-recording region 8, which track may be used as a track only for cleaning the slider. Further, a combination of FIG. 6 and 7 may be used.

With the operation described above, once the self-cleaning of the disk 1 and the slider 2 is completed, the control means 28 steadily rotates the disk 1 in the direction indicated by the arrow 5 for recording and regeneration of information on the disk 1.

Herein, the timing to perform the self-cleaning may be set such that it is performed each time the write/read operation is completed or every predetermined time, not limited to the time that the device is actuated for the write/read operation. Moreover, the self-cleaning may be started when the write/read operation is performed a preset number of times which is counted by a write/read starting counter 50, as shown in FIG. 1.

Furthermore, the repeated actuation and interruption of the motor by the cleaning motor control means 25 after the completion of the cleaning may be performed at the recording region without shifting the slider 2 to the non-recording region 8 and may scatter any falling dust in the recording region 8A to the outside by making use of centrifugal force.

The present invention, as described above, has an advantage that the adhesion of the dust to the tapered portion can be prevented, since the cleaning is performed by rotating the disk in the direction opposite to the rotational direction at recording and regeneration, so that a highly reliable disk device having a cleaning device and a cleaning method can be provided.

What is claimed is:

1. A cleaning device in a disk drive comprising: a disk having a recording region and a non-recording region, the surface of the non-recording region having surface means for enhancing dust removal; a slider adapted to float by an air stream on the surface of said disk and positioned by an actuator through a spring and an arm; a head mounted on said slider; positioning means for positioning said slider at a predetermined track position on the disk by controlling said actuator; motor control means for driving a motor serving to drive said disk in a first direction for writing/reading of information to the recording region of the disk; cleaning motor control means for rotating said disk in the opposite direction to the first direction for cleaning dust from the surface of the recording region of the disk; and seeking means for forcing the slider to move across the entire recording region of the disk during the opposite direction rotation of the disk causing any dust on the disk to adhere to the slider and thereafter to move the slider to the non-recording region of the disk during rotation of the disk in the first direction to contact the surface means for removal of any dust from the slider.

2. The cleaning device according to claim 1 wherein said cleaning motor control means forces any dust to fall from the slider by repeatedly starting and stopping the motor, after the slider is sought by the seeking means.

3. The cleaning device according to claim 1 wherein said cleaning motor control means rotates the motor at a lower rotational speed in the opposite direction than in the first.

4. The cleaning device according to claim 1 wherein when the slider is moved to the non-recording region, the motor control means starts and stops the motor.

5. The cleaning device according to claim 3 wherein the disk is rotated in a forward direction and at a normal speed for reading/writing information.

6. The cleaning device according to claim 1 wherein said seeking means and said cleaning motor control means are actuated before the positioning means and the writing means are actuated.

7. The cleaning device according to claim 1 wherein the surface means includes a lubricating layer disposed on the surface of the non-recording region.

8. The cleaning device according to claim 1 wherein the surface means includes a roughened surface layer on the non-recording region.

9. A cleaning device as recited in claim 1 including: a counter coupled to the cleaning motor control means, the motor control means, and the seeking means, the counter to count a number of writing/reading operations, and wherein the counter communicates with the cleaning motor control means and the seeking-means such that the cleaning motor control means rotates the disk in the opposite direction and the seeking means forces the slider to move across the disk after a predetermined number of writing/reading operations.

10. The cleaning device according to claim 9 wherein said cleaning motor control means forces any dust to fall from the slider by repeatedly starting and stopping the motor, after the slider is sought by the seeking means.

11. The cleaning device according to claim 9 wherein said cleaning motor control means rotates the motor at a lower rotational speed in the opposite direction than in a direction during the ordinary time of recording.

12. The cleaning device according to claim 9 wherein when the slider is moved to the non-recording region, the motor control means starts and stops the motor.

13. A cleaning device as claimed in claim 1 wherein the slider includes a tapered edge on a forward side thereof such that the slider will be elevated during rotation in the first direction and dust will contact a rearward side of the slider during the opposite direction rotation.

14. A method for cleaning a disk in a disk drive, comprising the steps of:
(a) rotating the disk oppositely to an ordinary direction of a read/write operation;
(b) cleaning a recording region on the disk by seeking a slider across the entire recording region while the disk is rotated oppositely to the ordinary direction causing dust on the recording region to adhere to the slider; and
(c) cleaning dust from the slider by contacting the slider to a surface of the non-recording region having a layer of material thereon for removing dust while the disk is rotated in the ordinary direction.

15. A cleaning method according to claim 14 wherein the cleaning the slider step includes contacting the slider to the surface of the non-recording region having a lubricating layer disposed thereon.

16. A cleaning method according to claim 14 wherein the cleaning the slider step includes contacting the slider to the surface of the non-recording region which is roughened.

17. A method for cleaning a disk as recited in claim 14 wherein the rotating step is performed using a motor control element and the step of cleaning a recording region is performed using a seeking element, the method further including the step of:
(d) using a counter, coupled to the motor control element and seeking element, to count a number of read/write operations such that the steps of rotating the disk and cleaning the recording region are not begun until after a predetermined number of read/write operations.

18. A method as claimed in claim 14 wherein the step of cleaning the recording region includes the step of seeking the slider across the recording region, the slider having a tapered edge on a forward side thereof such that dust will contact a rearward side of the slider when the disk is rotated oppositely to the ordinary direction.

19. A method for cleaning a magnetic disk in a disk drive, comprising the steps of:
   (a) rotating the magnetic disk oppositely to an ordinary direction of a read/write operation;
   (b) moving a slider across an entire recording region of the disk during the opposite direction rotation causing dust on the recording region to adhere to the slider;
   (c) thereafter moving the slider to a non-recording region of the disk and;
   (d) cleaning dust from the slider by repeatedly starting and stopping rotation of the disk in the ordinary direction and contacting a surface of the non-recording region having a layer of material thereon for removing dust with the slider for removing dust from the slider.

20. A cleaning method according to claim 14 wherein the cleaning the slider step includes contacting the slider to the surface of the non-recording region having a lubricating layer disposed thereon.

21. A cleaning method according to claim 19 wherein the cleaning the slider step includes contacting the slider to the surface of the non-recording region which is roughened.

22. A method for cleaning a disk as recited in claim 19 wherein the rotating step is performed using a motor control element and the seeking step is performed using a seeking element, the method further including the step of:
   (e) using a counter, coupled to the motor control element and seeking element, to count a number of read/write operations such that the rotating and seeking steps are not begun till after a predetermined number of read/write operations.

23. A method as claimed in claim 19 wherein the step of cleaning the recording region includes the step of seeking the slider across the recording region, the slider having a tapered edge on a forward side thereof such that dust will contact a rearward side of the slider when the disk is rotated oppositely to the ordinary direction.

24. A cleaning device in a disk drive comprising:
   a disk storage device having a recording region and a non-recording region, the non-recording region including a rough surface layer;
   a slider moveable across the surface of the disk and positioned by an actuator;
   a head mounted on the slider;
   a motor, operatively connected to the disk, to rotate the disk;
   a motor control mechanism, connected to the motor, to control the direction which the motor rotates the disk;
   a seeking mechanism; operatively connected to the slider, to cause the slider to move over the entire recording region to pick up dust therefrom while the disk is rotated in a first direction and thereafter to cause the slider to move to the non-recording region and contact the rough surface layer to remove the dust from the slider while the disk is rotated in a second direction, opposite to the first direction; and
   a counter, coupled to the motor control mechanism and the seeking mechanism, to count a number of read/write operations such that the seeking mechanism does not cause the slider to move over the recording region to pick up dust therefrom till after a predetermined number of read/write operations.

25. A cleaning device as claimed in claim 24 wherein the slider includes a tapered edge on a forward side thereof such that when the disk is rotated in the second direction dust contacts a rearward side of the slider and is picked up by the slider.

26. A method for cleaning a disk in a disk drive, the disk drive having a transducer for reading/writing information from the disk and a slider for carrying the transducer, the disk drive rotating the disk in a first direction during read/write operations, the disk having a recording region whereon information is stored and a non-recording region, the method comprising the steps of:
   (a) rotating the disk oppositely to the first direction; and
   (b) cleaning the recording region on the disk by moving the slider across the entire recording region as the disk is rotated in the direction opposite to the first direction such that dust from the recording region of the disk adheres to the slider.

27. A method for cleaning a disk as recited in claim 26 including the step of:
   (c) cleaning the slider by positioning it above the non-recording region and stopping the rotation of the disk so that dust is displaced from the slider.

28. A method for cleaning a disk as recited in claim 27 including the steps of:
   (d) restarting the rotation of the disk; and
   (e) repeatedly stopping and starting the rotation of the disk a predetermined number of times.

29. A method as claimed in claim 26 wherein the step of cleaning includes the step of positioning the slider having a tapered edge on a forward side thereof such that dust contacts a rearward side of the slider during the opposite direction rotation.

30. A method for cleaning a recording region of a disk in a disk drive, the disk being rotated in a forward direction during reading/writing from/to the recording region of the disk, the method comprising the steps of:
   rotating the disk in a rearward direction, opposite to the forward direction;
   moving a slider across the entire recording region of the disk during rotation of the disk in the rearward direction such that dust on the recording region will contact a rearward side of the slider and be picked up by the slider, the slider having a tapered edge on a forward side thereof; and
   cleaning dust from the slider.

31. A method for cleaning as claimed in claim 30 wherein the step of cleaning dust from the slider includes the steps of:
   rotating the disk in the forward direction; and
   contacting a cleaning region of the disk with the slider during the forward direction rotation to remove dust from the slider.

* * * * *